United States Patent
Sohn et al.

(10) Patent No.: US 8,055,854 B2
(45) Date of Patent: Nov. 8, 2011

(54) SYSTEM HAVING MEMORY DEVICE ACCESSIBLE TO MULTIPLE PROCESSORS

(75) Inventors: Han-Gu Sohn, Suwon-si (KR); Sei-Jin Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 616 days.

(21) Appl. No.: 11/342,848

(22) Filed: Jan. 31, 2006

(65) Prior Publication Data

US 2006/0236041 A1 Oct. 19, 2006

(30) Foreign Application Priority Data

Mar. 16, 2005 (KR) .................. 10-2005-0021841

(51) Int. Cl.
*G06F 12/00* (2006.01)
(52) U.S. Cl. ........... 711/149; 711/153; 711/154; 710/66
(58) Field of Classification Search .................. 711/149
See application file for complete search history.

(56) References Cited

U.S. PATENT DOCUMENTS

| 4,967,398 | A | * | 10/1990 | Jamoua et al. ........... 365/230.05 |
| 5,058,045 | A | * | 10/1991 | Ma .............................. 361/683 |
| 5,444,860 | A | * | 8/1995 | Datwyler et al. .............. 710/52 |
| 5,559,969 | A | * | 9/1996 | Jennings ...................... 710/307 |
| 5,768,546 | A | * | 6/1998 | Kwon ........................... 710/307 |
| 5,905,994 | A | * | 5/1999 | Hori et al. ..................... 711/113 |
| 6,078,527 | A | * | 6/2000 | Roth et al. ............... 365/189.04 |
| 6,378,058 | B1 | * | 4/2002 | Furuhashi ..................... 711/203 |
| 6,912,716 | B1 | * | 6/2005 | Johanson et al. ............. 719/312 |
| 6,987,961 | B1 | * | 1/2006 | Pothana .................... 455/412.1 |
| 2003/0093628 | A1 | | 5/2003 | Matter et al. |
| 2003/0219035 | A1 | * | 11/2003 | Schmidt ........................ 370/478 |
| 2005/0262327 | A1 | * | 11/2005 | Yoshimoto .................... 711/202 |

FOREIGN PATENT DOCUMENTS

| JP | 2000-215659 | | 8/2000 |
| JP | 2004-030506 | | 1/2004 |
| JP | 2005332145 | A * | 12/2005 |
| KR | 10-2004-93167 | | 11/2004 |

OTHER PUBLICATIONS

Korean Office Action dated Jul. 21, 2006 and English translation thereof.

* cited by examiner

*Primary Examiner* — Matthew Bradley
*Assistant Examiner* — Kalpit Parikh
(74) *Attorney, Agent, or Firm* — Harness, Dickey & Pierce, P.L.C.

(57) ABSTRACT

A system having a memory device accessible by a plurality of processors is provided. The system includes a memory device, a first processor, and a second processor. The memory device has a first memory array part and a second memory array part. The first processor predominantly accesses the first memory array part of the memory device and selectively accesses the second memory array part of the memory device. The second processor predominantly accesses the second memory array part of the memory device and selectively accesses the first memory array part of the memory device.

17 Claims, 3 Drawing Sheets

FIG. 1 (CONVENTIONAL)
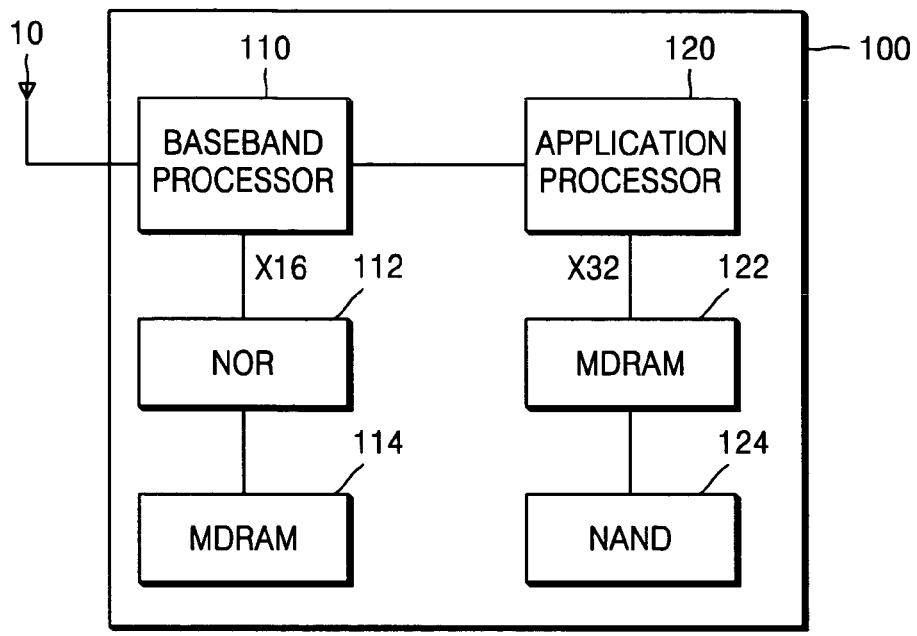
FIG. 2 (CONVENTIONAL)
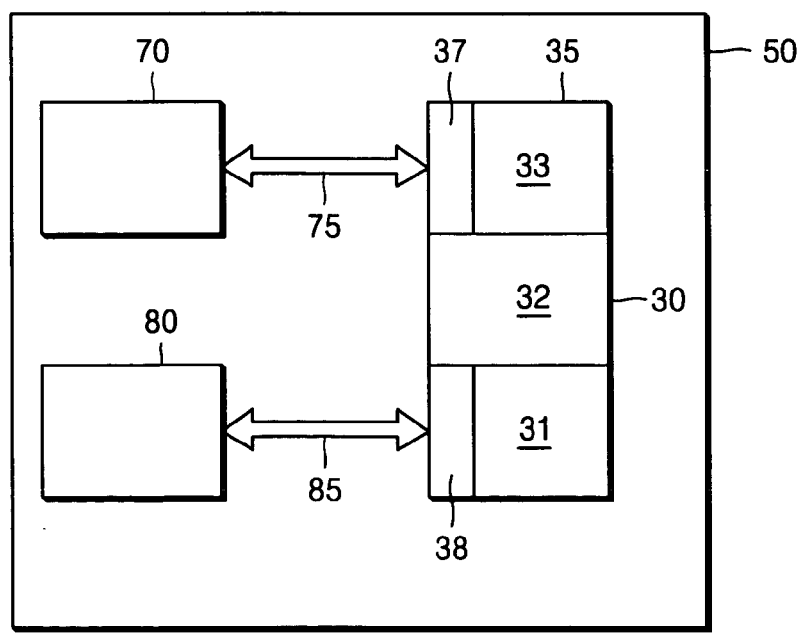

SYSTEM HAVING MEMORY DEVICE ACCESSIBLE TO MULTIPLE PROCESSORS

PRIORITY STATEMENT

This application claims the benefit of Korean Patent Application No. 10-2005-0021841, filed on Mar. 16, 2005, in the Korean Intellectual Property Office, the disclosure of which is incorporated herein in its entirety by reference.

BACKGROUND OF THE INVENTION

1. Field of the Invention

Example embodiments of the present invention relate to a system, for example, a portable communications apparatus, having a memory device accessible by a plurality of processors.

2. Description of the Related Art

Depending on the characteristics and functions of communications and/or operation systems of a portable communications system, a multi-processor system may be implemented, wherein each processor may have a particular task. For example, in a portable communications system, for example, a cellular phone, a baseband processor may process code data for use in communications and/or an application processor may process data, for example, pictures and/or moving images.

FIG. 1 illustrates a conventional portable communications system 100. Referring to FIG. 1, the conventional portable communications system 100 may include a baseband processor 110, which may process a signal received via an antenna 10 and an application processor 120, which may drive one or more multi-media devices. The baseband processor 110 may operate one or more communication modems, micro-processors, digital signal processors (DSPs), compressor/decompressors (CODECs), etc. The baseband processor 110 may use a NOR flash memory 112 and a small-capacity mobile DRAM (MDRAM) 114 to achieve high-speed data processing. The application processor 120 may include device drivers for driving one or more multi-media devices, for example, an input/output device (e.g., a keyboard, an LCD, a memory, an infrared, USB, a multi-media card (MMC), an SDIO card), an audio player, a camera, a video recorder etc. The application processor 120 may use a large-capacity MDRAM 122 and a NAND flash memory 124 to process large-capacity data.

In the conventional portable communications system 100 of FIG. 1, the baseband processor 110 exclusively uses the memory devices 112 and 114 and the application processor 120 exclusively uses the memory devices 122 and 124. The above-described structure may increase power consumption by the portable communications system 100 and the manufacturing costs thereof, in part, because the baseband processor 110 and application processor 120 do not share a memory device.

FIG. 2 describes a conventional portable communications apparatus that may have a memory that is used exclusively and/or shared by a plurality of processors. Referring to FIG. 2, the portable communications apparatus, which is indicated by reference numeral 50 herein, may include a plurality of processors 70 and 80 and a single memory device 30, which may have a single memory array 35.

The memory device 30 may be used to store data and/or instructions that may be executed by the processors 70 and 80. The memory array 35 may include parts 31, 32, and 33. The part 33 is used exclusively by the processor 70, so only the processor 70 can access the part 33. Similarly, the part 31 is used exclusively by the processor 80, so only the processor 80 can access the part 31. The part 32 allocated in the memory array 35 may be accessed by both the processors 70 and 80. For example, while one of the processors 70 and 80 reads out contents recorded in the part 32, the other can write data to the part 32.

In the portable communications apparatus 50, data processed by the processor 70 must be stored in the part 33 or 32 of the memory array 35, and data processed by the processor 80 must be stored in the part 31 or 32 of the memory array 35. If data to be processed by the processor 70 is stored in the part 31 of the memory array 35, the processor 70 cannot be used until the data stored in the part 31 is moved to the part 32 by processor 80. On the other hand, if data to be processed by the processor 80 is stored in the part 33 of the memory array 35, the processor 80 cannot be used until the data stored in the part 33 is moved to the part 32 by processor 70.

In other words, the processor 70 and/or the processor 80 are burdened with having to move data to be processed to the part 32, which is shared by the processors 70 and 80. The additional data moving operation may degrade the performance of the conventional portable communications apparatus 50 and/or increase the power consumption thereof.

SUMMARY OF THE INVENTION

Example embodiments of the present invention provide a portable communications system having a memory device accessible by a plurality of processors.

An example embodiment of a system of the present invention may include a memory device having a first memory array part and a second memory array part, a first processor predominantly accessing the first memory array part and selectively accessing the second memory array part, and a second processor predominantly accessing the second memory array part and selectively accessing the first memory array part.

Another example embodiment of a system of the present invention may include a baseband processor processing first data with a first data width; an application processor processing second data with a second data width that is different from the first data width; and a memory device having a first memory array part, a second memory array part from which data can be read by the baseband processor and the application processor, and a MUX converting the first data width of the first data into the second data width and the second data width of the second data into the first data width. The baseband processor may write the first data predominantly to the first memory array part, and the application processor may write the second data selectively to the first memory array part. The application processor may write the second data predominantly to the second memory array part, and the baseband processor may write the first data selectively to the second memory array part.

Another example embodiment of a system of the present invention may include at least one memory device having a first memory array part and a second memory array part, at least one first processor associated with the first memory array part, and at least one second processor associated with the second memory array part. The at least one first processor may be configured to access both the first memory array part and the second memory array part.

An example embodiment of the present invention provides a memory device. The memory device may include a first memory array part and a second memory array part. The first memory array part may be configured to be predominantly accessed by one or more first processors and selectively accessed by one or more second processors, whereas the second memory array part may be configured to be predominantly accessed by the second one or more processors and selectively accessed by the one or more first processors.

An example embodiment of the present invention provides a method of storing data. The method may include storing data processed by the first processor predominantly in a first memory array part and selectively in a second memory array part, and storing data processed by the second processor predominantly in the second memory array part and selectively in the first memory array part.

Example embodiments of a system of the present invention may include a portable communications apparatus having a memory device accessible by a plurality of processors and thus may be lighter, thinner, shorter, smaller, etc. than conventional systems having multiple memory devices dedicated for individual processors. Furthermore, according to example embodiments of the present invention, one or more memory array parts that store data required by a processor may be directly accessed by the plurality of processors to obtain desired and/or necessary data.

BRIEF DESCRIPTION OF THE DRAWINGS

The present invention will become more apparent by the following detailed description of example embodiments of the present invention with reference to the attached drawings in which:

FIG. 1 is a block diagram of an example of a conventional portable communications system;

FIG. 2 is a block diagram of another example of a conventional portable communications system;

DETAILED DESCRIPTION OF EXAMPLE EMBODIMENTS OF THE INVENTION

Figure 3:
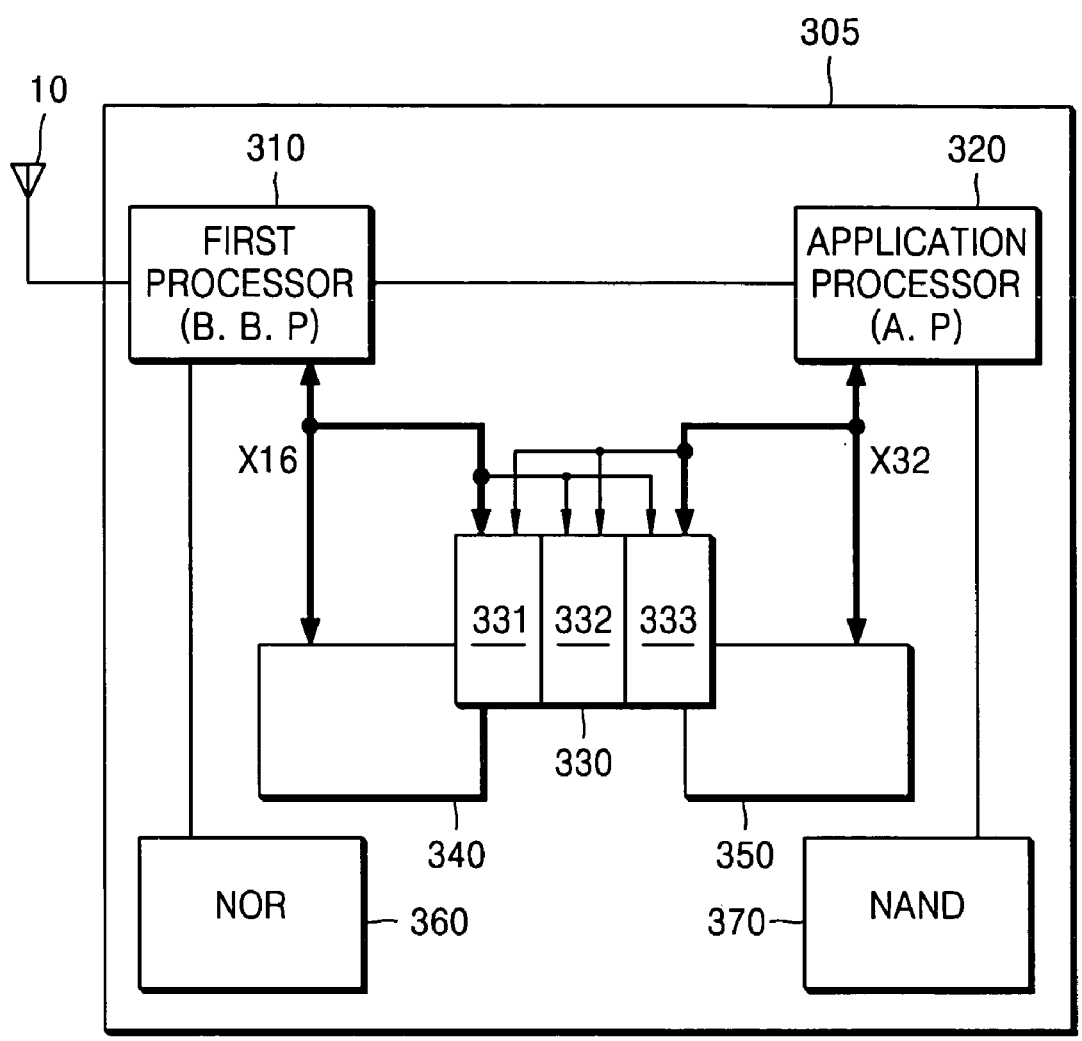
FIG. 3 is a block diagram of a system including a portable communications apparatus according to an example embodiment of the present invention.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, example embodiments of the present invention will be described with reference to the attached drawings. Like reference numerals denote like elements throughout the drawings.

FIG. 3 is a block diagram of an example embodiment of a system 300, which may include a portable communications apparatus 305. In FIG. 3, the portable communications apparatus 305 may be a mobile communications apparatus (e.g., a cellular phone), a personal communications system (PCS), a laptop computer, etc. However, it is apparent that the scope and application of example embodiments of the present invention are not limited to these examples.

An example embodiment of a portable communications apparatus 305 may include at least two processors, for example, a first processor 310 and a second processor 320. The first processor 310 may be a communications modem, a microprocessor, a digital signal processor (DSP), a compressor/decompressor (CODEC), a processor including a reduced instruction set computer (RISC) or a complex instruction set computer (CISCs), etc. The first processor 310 may also be a baseband processor (B.B.P) including one or more of the above-described processors. The second processor 320 may include device drivers for driving one or more multi-media devices, such as, for example, an input/output device (e.g., a keyboard, an LCD, a memory, an infrared, USB, a multi-media card (MMC), an SDIO card), an audio player, a camera, a video recorder, etc. The second processor 320 may also be an application processor (A.P.) into which the device drivers may be incorporated.

An example embodiment of a portable communications apparatus 305 may include a memory device 330 including a plurality of memory arrays. The memory device 330 may store data and/or instructions that may be processed by the first and/or second processors 310 and 320. The memory device 330 may be one or more of a DRAM, an SRAM, an EPROM, an EEPROM, a flash memory, etc. Further, the memory device 330 may be a storage medium, for example, a floppy disk, an optical disk, a CD-ROM, a magnetic optical disk, etc.

An example embodiment of a memory device 330 of the present invention may include a plurality of memory array parts accessible by the first and second processors 310 and 320. For example, the memory device 330 may include a first memory array part 331, a second memory array part 332, and a third memory array part 333. According to an example embodiment of the present invention, the first memory array part 331 may be predominantly accessed by the first processor 310 and selectively accessed by the second processor 320. In other words, data processed by the first processor 310 may be usually written to the first memory array part 331. However, when data stored in the first memory array part 331 is desired and/or required by the second processor 320, the second processor 320 can read the data directly from the first memory array part 331. Thus, the first processor 310 does not have to move data desired and/or required by the second processor 320 in order for the second processor 320 to access the desired and/or required data. Further, when data processed by the second processor 320 is desired and/or required by the first processor 310, the second processor 320 may write the data to the first memory array part 331. Accordingly, the first processor 310 can read the data processed by the second processor 320 from the first memory array part 331.

According to an example embodiment of the present invention, a second memory array part 332 may be accessible by both the first and second processors 310 and 320. Accordingly, the first and second processors 310 and 320 may simultaneously write data to and/or read data from the second memory array part 332. For example, while the first processor 310 is writing data to the second memory array part 332, the second processor 320 may read data from the second memory array part 332.

According to an example embodiment of the present invention, the third memory array part 333 may be predominantly accessed by the second processor 320. In other words, data processed by the second processor 320 may usually be written to the third memory array part 333. However, when data stored in the third memory array part 333 is data desired and/or required by the first processor 310, the first processor 310 can read the data directly from the third memory array part 333. Thus, the second processor 320 does not have to move the data desired and/or required by the first processor 310 in order for the first processor 310 to access the desired and/or required data. Further, when data processed by the first processor 310 is desired and/or required by the second processor 320, the first processor 310 may write the data to the third memory array part 333. Accordingly, the second processor 320 can read the data processed by the first processor 310 from the third memory array part 333.

According to an example embodiment of the present invention, to store additional data, for example, large-capacity data processed by the first processor 310, the portable communications apparatus 305 may further include one or more additional memory devices. For example, the portable communications apparatus 305 may further include a memory device 340 connected to the first processor 310 and/or the first memory array part 331. For example, when data processed by the first processor 310 is data about respective layers of a communication protocol (e.g., data about layer 1, layer 2, or layer 3) the data may be stored in the memory device 340. Likewise, according to an example embodiment of the present invention, to store additional data, for example, large-capacity data processed by the second processor 320, the communications apparatus may further include one or more additional memory devices. For example, the portable communications apparatus 305 may further include a memory device 350 connected to the second processor 320 and/or the third memory array part 333. The third memory device 350 may store data processed by the second processor 320, for example, operating system (OS) data, mega pixels for controlling a camera, data associated with camera functions (e.g., an optical zoom function), etc. The second memory device 340 and the third memory device 350 may be formed of, for example, a mobile DRAM to satisfy the performance of the portable communications apparatus 305.

An example embodiment of a portable communications apparatus 305 of the present invention may further include a NOR flash memory device 360, which may store, for example, a data code generated by baseband processing by the first processor 310, and/or a NAND flash memory device 370, which may store, for example, data generated by picture photographing, picture editing, picture transmission, moving image photographing of one or more input/output devices connected to the second processor 320, for example, a camera and/or video recorder.

According to an example embodiment of the present invention, a plurality of processors may have the same or different characteristics (e.g., interface, data width, capacity, processing speed, etc.). For example, the first processor 310 may have an interface of a ×16 data width and the second processor 320 may have an interface of a ×32 data width because picture/moving image processing in the second processor 320 may require higher performance and capacity characteristics. To write ×16 data of the first processor 310 and ×32 data of the second processor 320 and/or read ×16 data of the first processor 310 and ×32 data of the second processor 320 from the first, second, and third memory array parts 331, 332, and 333, an example embodiment of a memory device 330 of the present invention may be constructed as shown in FIG. 4.

Figure 4:
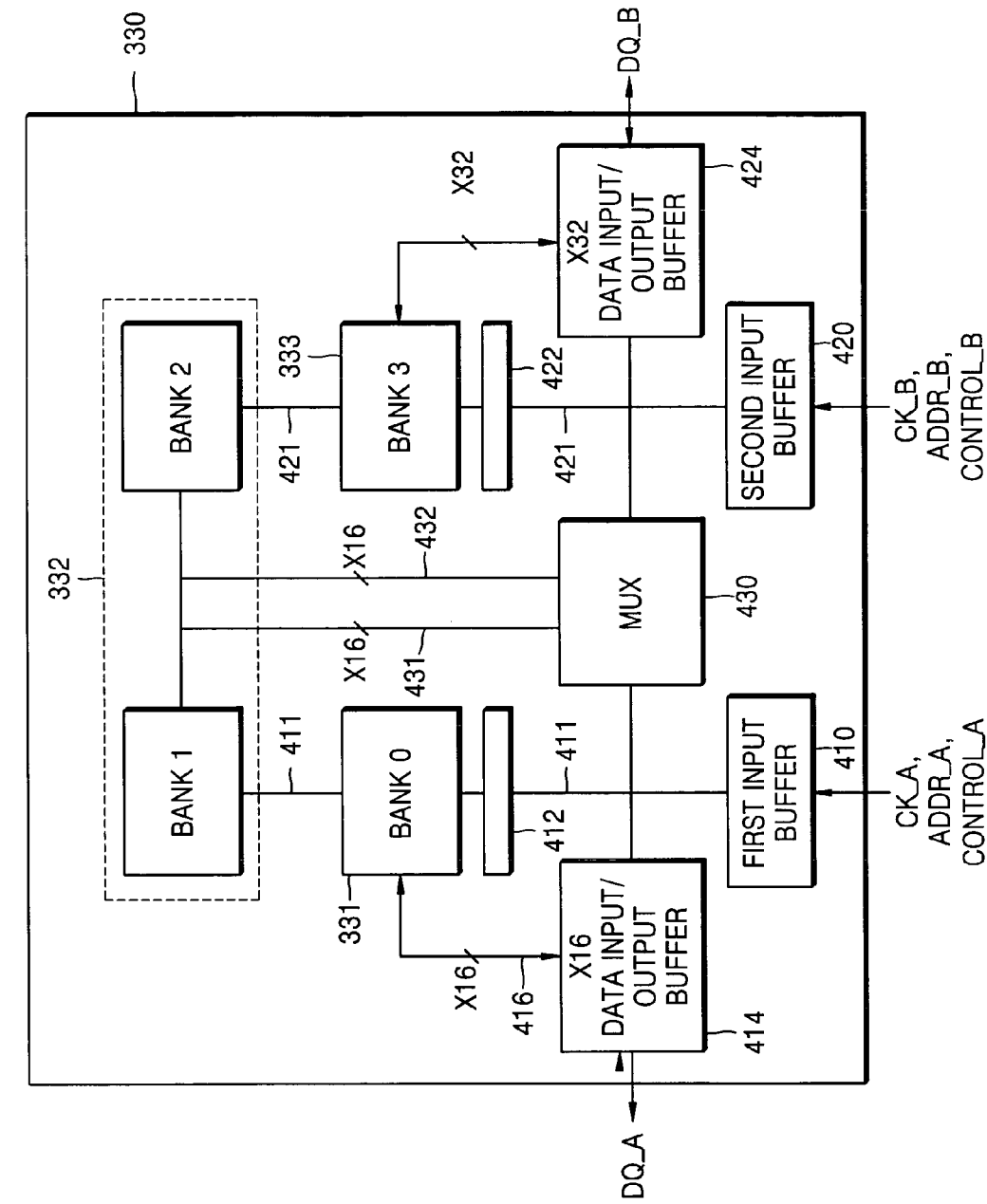
FIG. 4 is a block diagram of a memory device according to an example embodiment of the present invention.

Referring to an example embodiment of the present invention shown in FIG. 4, the memory device 330 may be a dual-port memory device which may receive and/or transmit first input/output data DQ_A and/or second input/output data DQ_B. The first, second, and third memory array parts 331, 332, and 333 in the memory device 330 may include a plurality of banks. For example, bank 0 may be allocated as the first memory array part 331, banks 1 and 2 may be allocated as the second memory array part 332, and bank 3 may be allocated as the third memory array part 333. Further, banks 0 and 1 may be operated by a first clock signal CK_A, first addresses ADDR_A, first control signals CONTROL_A, etc., and banks 3 and 2 may be operated by a second clock signal CK_B, second addresses ADDR_B, second control signals CONTROL_B, etc. In other words, the first and second memory array parts 331 and 333 may have different signals (e.g., different clocks, different addresses, different data, different control signals, different power supply voltages, etc.).

According to an example embodiment of the present invention, in bank 0, the first clock signal CK_A, the first addresses ADDR_A, and the first control signals CONTROL_A, which may be received via first input buffers 410, may address memory cells via a first decoder 412 and/or a first address/control path 411. The addressed memory cells may be configured and/or connected to the first input/output data DQ_A via a first data path 416 and a ×16 data input/output buffer 414 to write and/or read ×16 data processed by the first processor 310.

According to an example embodiment of the present invention, in bank 3, the second clock signal CK_B, the second addresses ADDR_B, and the second control signals CONTROL_B, which may be received via second input buffers 420, address memory cells via a second decoder 422 and/or a second address/control path 421. The addressed memory cells may be configured and/or connected to the second input/output data DQ_B via a ×32 data input/output buffer 424 to write and/or read ×32 data processed by the second processor 320.

According to an example embodiment of the present invention, bank 1 may be configured to have a bank address (not shown) different from a bank address of bank 0, to have a data path 431, and to share the first address/control path 411 with bank 0. Bank 2 may be configured to have a bank addresses (not shown) different from a bank address of bank 3, to have a data path 432, and to share the second address/control path 421 with bank 3.

According to an example embodiment of the present invention, the memory device 330 may further include a MUX 430 so that the first memory array part 331 may be selectively accessed by the second processor 320 and/or the third memory array part 333 may be selectively accessed by the first processor 310 as described above with reference to previously described example embodiments of the present invention.

A MUX 430 included in an example embodiment of the present invention may convert first input/output data DQ_A, which may be received via the ×16 data input/output buffer 414 and may represent ×16 data processed by the first processor 310, into ×32 data by doubling a burst length of the ×16 data. For example, data processed by the first processor 310 may be converted into ×32 data by the MUX 430 and written to bank 3 via the ×32 data input/output buffer 424. Further, for example, ×32 data stored in bank 3 may transmitted to the MUX 430 via the ×32 data input/output buffer 424. The MUX 430 may receive the ×32 data and convert the ×32 into two ×16 data by halving a burst length of the ×32 data. The two ×16 data may pass through the ×16 data input/output buffer 414 and be read-out as first input/out data DQ_A.

The MUX 430 included in an example embodiment of the present invention may convert second input/output data DQ_B, which may be received via the ×32 data input/output buffer 424 and may represent ×32 data processed by the second processor 320, into two ×16 data by halving a burst length of the ×32 data. For example, data processed by the second processor 320 may be converted into the two ×16 data by the MUX 430 and be written to bank 0 via the ×16 data input/output buffer 414. Further, for example, ×16 data stored in bank 0 may be transmitted to the MUX 430 via the ×16 data input/output buffer 414. The MUX 430 may receive the ×16 data and convert the ×16 into ×32 data by doubling a burst length of the ×16 data. The ×32 data may pass through the ×32 data input/output buffer 424 and be read-out as second input/out data DQ_B.

According to an example embodiment of the present invention, MUX 430 may write data processed by the first processor 310 and converted into ×32 data to banks 1 and 2 via the data paths 431 and/or 432 and may write data processed by the second processor 320 and converted into the two ×16 data to banks 1 and 2 via the data paths 431 and 432.

While the present invention has been shown and described with reference to example embodiments of the present invention, it will be understood by those of ordinary skill in the art that various changes in form and details may be made therein without departing from the spirit and scope of the present invention.

For example, although a portable communications apparatus having two processors and three memory array parts accessible by the two processors have been described according to example embodiments of the present invention, a portable communications apparatus may include 3 or more processors and a plurality of memory array parts accessible by the 3 or more processors. Further, according to an example embodiment of the present invention shown in FIG. 3, the first, second, and third memory array parts 331, 332, and 333 may be disposed to be adjacent to and/or in contact with each other within the memory device 330, however, the spirit and scope of the invention also extends to first, second, and third memory array parts that are not adjacent to and/or in contact with each other. Still further, although the first, second, and third memory array parts 331, 332, and 333 may be comprised of banks as shown in FIG. 4, the first, second, and third memory array parts may also be defined by dividing a single memory array using an extended mode register set (EMRS). Still further, example embodiments of the present invention were described referencing ×16 data and ×32 data, however, one skilled in the art should appreciate that ×8 data, ×64 data, ×128 data, etc. could be used without departing from the spirit and scope of the present invention.

What is claimed is:

1. A system comprising:
   a memory device having a converting part, a first memory array part and a second memory array part;
   a first processor configured to process a first data with a first data width, configured to selectively access the first memory array part and configured to selectively access the second memory array part; and
   a second processor configured to process a second data with a second data width different from the first data width, configured to selectively access the second memory array part and configured to selectively access the first memory array part, wherein
   the converting part is configured to convert the first data width of the first data into the second data width and is configured to store the converted first data in the second memory array part, and
   the converting part is configured to convert the second data width of the second data into the first data width, and is configured to store the converted second data in the first memory array part.

2. The system of claim 1, wherein the memory device further includes a third memory array part accessible by the first processor and the second processor.

3. The system of claim 1, further comprising:
   at least one additional memory device connected to at least one of the first memory array part and the second memory array part.

4. The system of claim 1, wherein the first memory array part and the second memory array part are provided with different clock signals.

5. The system of claim 1, wherein the first memory array part and the second memory array part are connected to different power supplies.

6. The system of claim 1, wherein the first memory array part and the second memory array part are connected to different data input/output lines.

7. The system of claim 1, wherein the converting part is a converter.

8. The system of claim 1, wherein the system is a portable communications apparatus.

9. A system comprising:
   a baseband processor configured to process a first data with a first data width;
   an application processor configured to process a second data with a second data width that is different from the first data width; and
   a memory device having a first memory array part and a second memory array part from which the first and second data can be read by the baseband processor and the application processor; and
   a converter configured to convert the first data width of the first data into the second data width and configured to store the converted first data in the second memory array part, and configured to convert the second data width of the second data into the first data width and configured to store the converted second data in the first memory array part, wherein,
   the baseband processor is configured to selectively write the first data to the first memory array part and the application processor is configured to selectively write the second data to the first memory array part, and
   the application processor is configured to selectively write the second data to the second memory array part and the baseband processor is configured to selectively write the first data to the second memory array part.

10. The system of claim 9, wherein the memory device further includes a third memory array part commonly accessible by the baseband processor and the application processor.

11. The system of claim 9, wherein the memory device is a dual-port memory device.

12. The system of claim 9, further comprising: a mobile DRAM connected to the first memory array part.

13. The system of claim 9, further comprising: a mobile DRAM connected to the second memory array part.

14. The system of claim 9, wherein the first memory array part and the second memory array part are provided with different clock signals.

15. The system of claim 9, wherein the first memory array part and the second memory array part are connected to different power supplies.

16. The system of claim 9, wherein the first memory array part and the second memory array part are connected to different data input/output lines.

17. A memory device comprising:
a converting part;
a first memory array part; and
a second memory array part, wherein
the first memory array part is configured to be selectively accessed by at least one first processor and configured to be selectively accessed by at least one second processor,
the second memory array part is configured to be selectively accessed by the at least one second processor and configured to be selectively accessed by the at least one first processor,
the converting part is configured to convert a first data width of a first data selectively accessed by the at least one first processor into a second data width different from the first data width and is configured to store the converted first data in the second memory array part, and
the converting part is configured to convert the second data width of a second data selectively accessed by the at least one second processor into the first data width and is configured to store the converted second data in the first memory array part.

* * * * *